June 2, 1959  C. B. KAUFMANN  2,888,716
BARRIER STRUCTURE
Filed Sept. 19, 1956  2 Sheets-Sheet 1

INVENTOR.
Charles B. Kaufmann
BY
Bacon & Thomas
ATTORNEYS

June 2, 1959

C. B. KAUFMANN 2,888,716

BARRIER STRUCTURE

Filed Sept. 19, 1956

INVENTOR.
Charles B. Kaufmann
BY
Bacon & Thomas
ATTORNEYS.

United States Patent Office 2,888,716
Patented June 2, 1959

2,888,716

BARRIER STRUCTURE

Charles B. Kaufmann, Moline, Ill.

Application September 19, 1956, Serial No. 610,737

7 Claims. (Cl. 20—1)

This invention relates to barrier structures for keeping birds from alighting and roosting on buildings or other structures and for keeping rodents and other animals from climbing poles, piling, etc., and from crawling on other surfaces or from entering enclosures where their presence would be annoying or detrimental.

This application discloses an improvement over the structure shown and claimed in the copending application of Fred S. Burnside, Hillmar R. Plath and Charles B. Kaufmann, Serial No. 206,772, filed January 19, 1951, entitled "Bird and Rodent Barrier." The structure disclosed and claimed in that application comprises a barrier structure in which a longitudinally-ribbed strip of flexible sheet metal comprises a base member to which transverse spring wire elements are welded and embedded in the downwardly projecting rib. The spring wire elements extend upwardly and outwardly from the base in mutually diverging relation and are all pointed at their ends. That structure has been found to be extremely effective as a barrier for birds and rodents in most installations but it has been found that certain birds and certain other animals are capable of destroying the effectiveness of that barrier. For example, pigeons and other large birds have been known to approach the barrier from an end thereof, place their head between the central wires, and force their way along the barrier between the central upstanding wires and thus bend all the wires outwardly and provide themselves a roosting or nesting place. It has also been found that certain small birds, incapable of bending the wires, were able to alight on the barrier and grasp the wires themselves inwardly of their pointed ends and thus roost thereon.

The present invention comprises improvements on the barrier structure of said copending application, and particularly improving the barrier structure in a manner to foil the attempts of large birds to bend the wires and render the barrier ineffective, to prevent small birds from alighting directly thereon, and to provide a more effective barrier for cats, rodents, and the like. In general, the improvement comprises a barrier structure of the same general type as disclosed in said copending application but wherein certain of the transverse wires are formed with straight portions bent to extend generally directly upwardly from opposite sides of the base member in close proximity to each other. It has been found that such a structure, wherein the wires are sufficiently close to prevent larger birds, such as pigeons, from placing their heads between the upstanding wires, is highly effective to prevent such birds from entering the central space, from an end thereof, and bending the wires outwardly. It is believed that the spacing of the upstanding central wires, if less than the distance between the bird's eyes, will completely prevent them from poking their heads between the wires in the first instance and thus prevent their destruction of the barrier.

A further feature of the improved invention resides in the provision of substantially straight end portions on each of the wires with those straight portions extending directly upwardly, all in substantially parallel relation whereby even small birds cannot then grasp the wires below the pointed ends and roost thereon. It has been found that where a multiplicity of pointed wires were used, even though the points were located relatively close together, where the portions of the wires adjacent the points extend at an oblique angle to the vertical, small birds would descend and grasp the wires below the points and rest thereon. By arranging the end portions vertically and making them substantially straight, small birds cannot grasp the wires sufficiently tightly to prevent their sliding down thereon and engaging the sharpened points.

In another form of the improved invention, particularly adapted for attachment to vertical surfaces, the ends of the spring wires extend in opposite directions laterally of the base member so that when placed on a vertical surface, such as the periphery of a tree, piling or the like, the points on the upper side of the barrier extend vertically upward and those on the lower side extend vertically downward, thus constituting an effective barrier against climbing animals and at the same time constituting an effective barrier against birds since the birds cannot alight on the vertically directed points. Installation of such a form of the invention on a vertical surface may be for the purpose of preventing passage of climbing animals or may be in conjunction with a barrier structure placed on an adjacent horizontal surface to act as a further deterrent to birds roosting on building ledges or the like.

The improved form of the invention also includes a base member comprising a generally round wire rather than a flat strip of sheet metal. By employing the wire base member, the barrier may be bent in a horizontal plane, that is, laterally on the surface to which it is to be applied, and thus greatly increase the ease of installation in many instances.

It is therefore an object of this invention to provide a barrier especially effective to prevent small birds from alighting directly on the wires thereof.

It is another object of the invention to provide a barrier adapted to prevent large birds from bending the barrier elements outwardly to render the structure ineffective.

Still another object of the invention is to provide a barrier structure effective to prevent climbing or crawling animals from traversing selected surfaces.

A further object of the invention is to provide a barrier, as set forth above, which may be applied to a vertical surface and is effective thereon to prevent roosting of birds thereon or in the vicinity thereof.

A still further object of the invention is to provide a barrier structure that can be readily bent in any direction to conform to the curvature or outline of any surface.

Still further objects and advantages will become apparent to those skilled in the art as the description proceeds in connection with the accompanying drawings, wherein.

Figure 1:
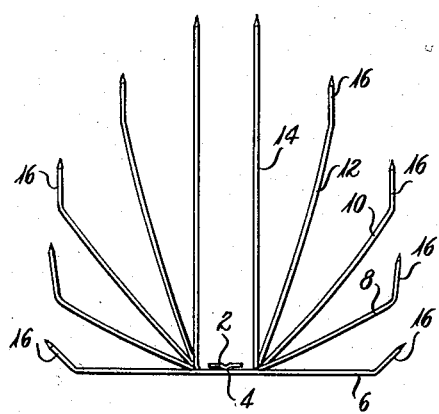
Fig. 1 is an end elevational view of an improved form of barrier structure.
Figure 2:
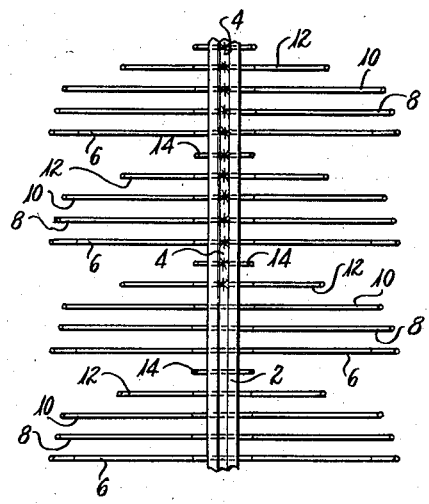
Fig. 2 is a fragmentary top plan view of the structure of Fig. 1.

Referring first to Figs. 1 and 2, the barrier structure shown therein includes an elongated base member 2 comprising a strip of readily bendable sheet material, preferably stainless steel, formed to define a downwardly projecting longitudinal rib 4. A plurality of transversely extending wire members 6, 8, 10, 12 and 14 are welded, intermediate their ends, to the bottom of the base member 2 to extend transversely thereof as clearly shown in Fig. 2. The transverse members 6—14 are preferably of spring-tempered stainless steel and are welded at their medial points to the underside of the base member 2 and embedded in the rib 4. The structure thus far described is that disclosed and claimed in the copending application heretofore identified. As is clearly evident from Fig. 2, the transverse members 6 extend substantially horizontally outwardly from the base member 2 and their end portions 16 are bent upwardly and pointed. The transverse members are arranged on the base member in repeated groups with the members 6 of each group extending as described, the members 8 being somewhat longer than members 6 and extending upwardly and outwardly at a relatively low angle. The members 10 and 12 of each group are respectively longer and extend upwardly and outwardly at steeper angles. The members 14 preferably extend substantially vertically upwardly from opposite sides of the base member 2 in close proximity to each other and they terminate in upwardly directed points. Each of the members 8, 10 and 12 is also provided with a pointed end portion 16. The end portions 16 of the members 8, 10 and 12 and the pointed ends of the members 14 all extend vertically and are substantially straight whereby they lie in parallel planes. Thus the barrier defines a generally semi-cylindrical surface comprising many sharp points distributed thereover. The structure shown in Figs. 1 and 2 may be applied to any desired horizontal surface by suitable clips or by adhesive or other means and the members 6 function to hold the barrier structure against inadvertent tilting and thus render it highly stable. The transverse members 14, being of tempered spring wire and extending upwardly in close proximity to each other prevent large birds from entering the end of the barrier structure and spreading the members outwardly in the manner heretofore described. Since the end portions of the members 8, 10, 12 and 14 extend vertically, it will be obvious that small birds cannot descend on the barrier structure and grasp the wires below the points to rest thereon. The structure of Fig. 1 has been found highly effective against both large and small birds in the manner described. While the end portions 16 of the transverse members 6 are shown herein as extending obliquely upwardly and outwardly, it is contemplated that they may be arranged to extend vertically upwardly.

Figure 3:
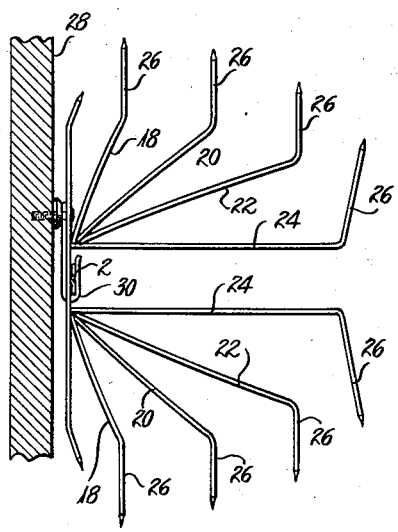
Fig. 3 is an end elevational view of a further form of improved barrier showing the same applied to a vertical surface.
Figure 4:
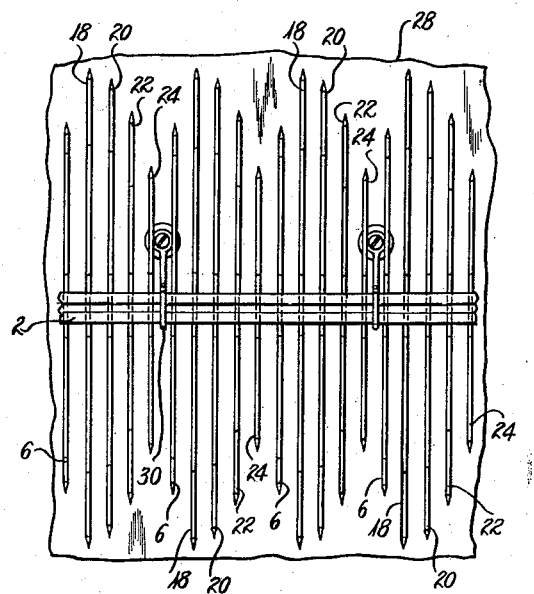
Fig. 4 is a fragmentary side view of the structure of Fig. 3 as viewed from the righthand side of Fig. 3.

In the modification shown in Figs. 3 and 4, the base member 2 is identical to that disclosed in connection with Figs. 1 and 2 and the transverse spring wire members 6 are also identical to those described in connection with Figs. 1 and 2. The transverse members 18, 20, 22 and 24 extend from the base member 2 generally in the same relative directions as described in connection with Figs. 1 and 2 but their straight and pointed end portions 26 are bent to extend laterally of the base member 2. The straight pointed end portions shown at the top of Fig. 3 are directed upwardly, whereas those on the bottom portion of the structure of Fig. 3 point vertically downwardly when the barrier is mounted on a vertical surface 28, as shown. The end portions 26 are thus all arranged to lie in parallel planes. The barrier structure of this modification may be secured to the vertical surface 28 by means of suitable spring clips 30, fully described in the copending application previously identified.

It is obvious that the application of the barrier structure of Fig. 3 to a vertical surface, such as by wrapping the same around a tree, pole, piling or the like, constitutes a completely effective barrier to small animals, and even many larger ones, attempting to climb the pole or the like. At the same time the upwardly directed points on the upper side of the barrier constitute a completely effective deterrent to the alighting and roosting thereon of birds, either large or small.

The structure of the modification of Fig. 3 also finds wide use in conjunction with that shown in Figs. 1 and 2 in many installations. In many cases it is desired to place a barrier structure like that of Fig. 1 on a horizontal ledge projecting outwardly from a building but wherein the barrier structure does not cover the entire ledge. In such instances such a structure as shown in Fig. 3 may be applied to the vertical surface above the ledge and thus complement the structure of Fig. 1 to constitute a complete barrier.

It has been found that in some instances such structures as shown in Fig. 1, when applied to narrow ledges, are rendered ineffective by certain birds. Those birds carry sticks, twigs, and other debris, and drop them on the barrier structure until a sufficient pile has been amassed to constitute a safe landing spot. By mounting such a structure as shown in Fig. 3 on a vertical surface extending upwardly behind the ledge, the birds are prevented from flying directly over the barrier on the ledge and are thus prevented from depositing debris on the barrier and are completely foiled in their attempts to manufacture a safe landing place.

Figure 5:
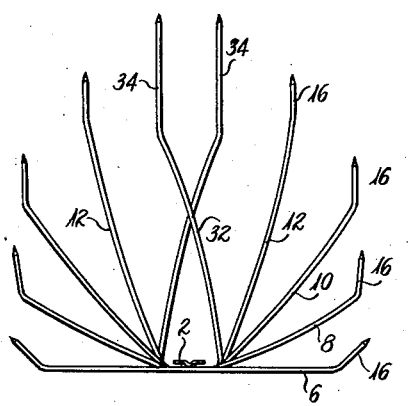
Fig. 5 is an end elevational view of a still further form of improved barrier structure.
Figure 6:
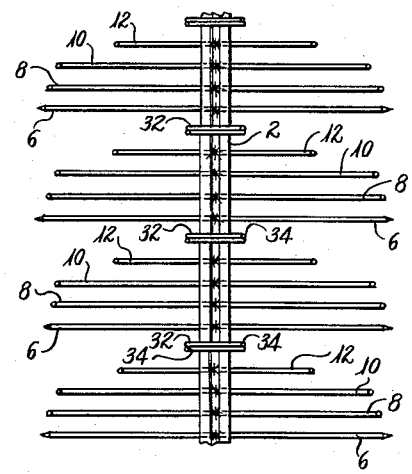
Fig. 6 is a fragmentary top plan view of the structure shown in Fig. 5.

Referring now to Figs. 5 and 6, a base member 2 and short transverse members 6 are shown identical to those of the forms of Figs. 1 and 3. Transverse members 8, 10 and 12 are also identical to corresponding transverse members of Fig. 1. The longest or central members 32, however, extend upwardly from opposite sides of the base member 2 with the portions on opposite sides of that base member in close proximity to each other and in crossed relation. The upper portions 34 of the members 32 are likewise straight, pointed, and vertically arranged in planes parallel to the straight portions 16 of the members 8 through 12. This form has all of the advantages of that of Fig. 1 but is of even greater rigidity and therefore more effective against any birds who acquire the knack of entering the barrier from the end and walking along the base member 2 to spread the pointed transverse members. The form of Fig. 5 has been found highly effective against such birds. It is important that the point at which the portions of the members 32 cross each other be well below the upper pointed ends thereof and that the pointed ends be in relatively close proximity to each other. If the pointed ends 34 were not in close proximity, small birds could descend on the barrier and grasp the wires 32 at the points of crossing and roost thereon. It has been found that where the members 32 cross each other closely adjacent their upper ends and where the pointed ends thereof extend slightly outwardly, small birds soon learn to grasp the crossed portions in the manner described and thus render the barrier ineffective as to them. It has further been found that construction of the barrier in accordance with the showing of Fig. 5 completely prevents small birds from so alighting on the structure. In all of the forms described the wire of the transverse members is so small in diameter that even small birds find it difficult to grasp the wire tightly in their claws.

Figure 7:
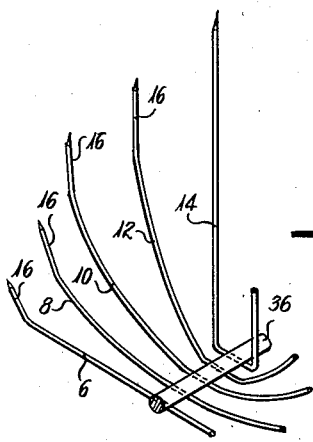
Fig. 7 is a fragmentary perspective view of a barrier structure employing a different form of base member.

Fig. 7 is a fragmentary perspective view of the improved barrier and while it illustrates the transverse members 6, 8, 10, 12 and 14, as being configured like those of Fig. 1, it is to be understood that the figure is merely illustrative of a feature of the invention and that the transverse members may be of the forms of Fig. 3 or Fig. 5. The essence of this modification is the provision of a base member 36 of flexible metal wire, preferably of stainless steel, wherein the transverse members are welded to the bottom side thereof in the illustrated longitudinally spaced relation. The wire 36 is readily bendable in either a horizontal or vertical, or both, plane and a length of the barrier structure may be readily bent to form horizontal curves with upwardly extending prongs or bent to form curves with radially outwardly extending prongs, depending upon the nature of the structure to be protected. The base member 2 of Figs. 1, 3 and 5 may also be bent laterally by employing a tool to crimp or stretch one edge thereof and thus form the base member into a transversely curved structure. The improvement of Fig. 7 eliminates the necessity of employing a special tool since that form may be readily bent by hand at the time of installation, thus saving time and the expense of special tools.

In all of the forms illustrated, such clips as the clip 30 of Fig. 3 may be employed to mount the structures on their respective supporting surfaces or they may be supported thereon in any other suitable manner.

While a limited number of modifications of the improved barrier structure have been shown and described herein, it is to be understood that the illustrations are not limiting and that the invention includes other forms falling within the scope of the appended claims.

I claim:

1. A barrier structure comprising, a single narrow elongated and readily bendable metal base member, longitudinal spaced transversely extending members of thin spring wire welded intermediate their ends to the underside of said base member, said transverse members extending upwardly and outwardly, in diverging relation from opposite sides of said base member, said transverse members being of different lengths and extending from said base member at different angles, substantially all of said transverse members terminating in substantially straight and pointed end portions bent to lie in substantially parallel relation to each other.

2. A barrier structure as defined in claim 1 wherein certain longitudinally spaced transverse members extend straight outwardly from said base member, in opposite directions, to give said barrier structure lateral stability when said base member is secured to a supporting surface.

3. A barrier structure as defined in claim 1 wherein the major portion of certain longitudinally spaced transverse members extend from opposite sides of said base member substantially parallel to each other in relatively close proximity to each other and from positions close to said base member.

4. A barrier structure as defined in claim 1 wherein the said end portions of said transverse members all extend upwardly whereby to prevent small birds from alighting and resting thereon.

5. A barrier structure as defined in claim 1 wherein the said end portions of said transverse members on opposite sides of said base member extend respectively in opposite lateral directions.

6. A barrier structure as defined in claim 1 wherein the extending portions of certain longitudinally spaced transverse members extend upwardly from opposite sides of said base member in crossed relation, the said end portions thereof extending upwardly in relatively close proximity and generally parallel relation to each other.

7. A barrier structure as defined in claim 1 wherein said base member comprises a wire readily bendable in any direction.

References Cited in the file of this patent

UNITED STATES PATENTS 2,142,371    Peles _____ Jan. 3, 1939

OTHER REFERENCES

Architectural File (1955), Sweet's Catalog Service Section, No. 5i, Catalog No. Ni.